United States Patent [19]

Lamanna et al.

[11] Patent Number: 4,871,790

[45] Date of Patent: Oct. 3, 1989

[54] COLLOIDAL METALS IN MONOMERS OR POLYMERS

[75] Inventors: William M. Lamanna, Stillwater; Fred B. McCormick, Maplewood; Robin E. Wright, Inver Grove Heights, all of Minn.

[73] Assignee: Minnesota Mining and Manufacturing Company, St. Paul, Minn.

[21] Appl. No.: 125,600

[22] Filed: Nov. 25, 1987

[51] Int. Cl.[4] .......................... C08K 3/08; C08G 18/22
[52] U.S. Cl. ...................................... 523/333; 524/430; 524/431; 524/432; 524/433; 524/439; 524/440; 524/441; 524/577; 524/779; 524/780; 524/781; 524/783; 524/784; 524/785; 524/786; 524/853; 524/871; 528/56; 528/58; 106/196; 106/217; 106/403
[58] Field of Search ............... 524/403, 779, 780, 781, 524/783, 784, 785, 786, 871, 430, 431, 432, 433, 439, 440, 441, 577, 853; 106/403, 196, 217; 523/333; 526/108, 906, 908; 528/56, 58

[56] References Cited

U.S. PATENT DOCUMENTS

| | | | |
|---|---|---|---|
| 2,947,646 | 8/1960 | Devaney | 106/403 |
| 3,074,801 | 1/1963 | Gessler | 106/403 |
| 4,040,815 | 8/1977 | Francois | 502/344 |
| 4,048,420 | 9/1977 | Francois | 526/173 |
| 4,116,710 | 9/1978 | Heikel | 106/403 |
| 4,292,253 | 9/1981 | Ozin | 556/9 |
| 4,421,660 | 12/1983 | Hajna | 524/780 |
| 4,661,468 | 4/1987 | Lee | 502/332 |
| 4,713,403 | 12/1987 | Yoshida | 524/403 |

FOREIGN PATENT DOCUMENTS

| | | | |
|---|---|---|---|
| 108622 | 5/1984 | European Pat. Off. | 524/403 |
| 7005771 | 10/1971 | Netherlands | 524/780 |

OTHER PUBLICATIONS

Kimura et al., *Bull. Chem. Soc. Jpn.*, 1983, 56, 3578.
Kosobudski, *Polymer Science USSR*, 1985, 27, 689.
Gubin et al., *Science Journal Digest*, 272:5, 19833.
Hirai, *Makromol. Chem. Suppl.*, 1985, 14, 55.
S. T. Lin et al., *Langmuir*, 1986, 2, 259.
Ozin et al., *J. Phys. Chem.*, 1986, 90, 2929.

*Primary Examiner*—John C. Bleutge
*Assistant Examiner*—David Buttner
*Attorney, Agent, or Firm*—Donald M. Sell; Walter N. Kirn; Lorraine R. Sherman

[57] ABSTRACT

A polymeric composition of matter comprises a polymer having dispersed therein at least one of colloidal metal and metal oxide particles in the submicrometer size range, said composition being aqueous-free and free of aliphatic hydrocarbon polymers and their halogenated derivatives. Methods for preparing the dispersions of the invention are also disclosed.

16 Claims, No Drawings

COLLOIDAL METALS IN MONOMERS OR POLYMERS

FIELD OF THE INVENTION

This invention relates to compositions of matter comprising polymers having colloidal metals or metal oxides dispersed therein. In another aspect, methods for preparing these compositions are described. In a further aspect, articles containing the compositions of the invention are disclosed. The compositions can be used, for example, in the field of catalysis.

BACKGROUND OF THE INVENTION

It is well known in the art to introduce metals into organic solvents and polymers by chemical reduction or thermal degradation means. Preparation of metal colloids in nonpolymerizable organic solvents by a gas evaporation technique (GER) was reported (Kimura, K.; Bandow, S. *Bull. Chem. Soc. Jpn.* 1983, 56, 3578). Thermal degradation of organometallic compounds of transition metals (Fe, Ni, Cr) to form metallic clusters in polyethylene and polytetrafluoroethylene wherein the clusters may exhibit a bimodal size distribution was published by Kosobudskii et al. (*Polymer Science U.S.S.R.* 1985, 27, 689) and S. Gubin and I. Kosobudsky, *Science Journal Digest* 272:5 (1983).

Metal colloids have been generated in polymers in the presence of water, and metal salts in polymers have been generated in nonaqueous media (see Hirai, H. *Makromol. Chem., Suppl.* 1985, 14. 55).

Generation of metal colloids in nonpolymerizable organic solvents by the metal atom technique was taught by Lin, S.-T.; Franklin, M. T.; Klabunde, K. J. in *Langmuir*, 1986, 2, 259.

U.S. Pat. No. 4,292,253 discloses a process using metal atom techniques for generating organometallic clusters having a small number of metal atoms (2-13 metal atoms) in liquid arene-containing polymers.

Ozin and Andrews in *J. Phys. Chem.* 1986, 90, 2929 disclose colloidal silver dispersions formed in liquid polyolefins such as poly(butadiene) and poly(isoprene) using metal atom techniques.

SUMMARY OF THE INVENTION

Briefly, the present invention discloses a polymeric composition of matter which is aqueous-free and free of aliphatic hydrocarbon polymers and their halogenated derivatives comprising a polymer having dispersed therein at least one of colloidal metal and metal oxide particles in the submicrometer size range, preferably in the size range of 2 to 200 nanometers (nm).

In another aspect, the present invention provides three methods for the preparation of colloidal metal and metal oxide containing polymers, as follows:

Method I

Metal colloids can be directly introduced into polymerizable liquid monomers comprising the steps:

(a) forming a colloidal metal dispersion by the metal atom technique in a polymerizable liquid monomer optionally diluted with a non-aqueous diluent, (b) effecting polymerization of the monomer, and (c) isolating the resultant colloidal metal-containing polymer.

Method II

Metal colloids can be introduced into polymers by the steps:

(a) providing a non-polymerizable, non-aqueous organic liquid, performing step (b) and (c) in either order, (b) forming a colloidal metal dispersion by the metal atom technique in said liquid, (c) dissolving into or swelling by said liquid a solid polymer, and (d) isolating the resultant colloidal metal-containing polymer.

Method III

Metal colloids can be directly introduced into polymeric compositions of matter free of aliphatic hydrocarbon polymers and halogen derivatives by the steps:

(a) providing a colloidal metal dispersion by the metal atom technique in a liquid polymer, optionally in the presence of a non-aqueous diluent, (b) effecting further polymerization of the polymer, and (c) isolating the resultant colloidal metal-containing polymer.

The colloidal dispersions described herein are an advance over the current art because (a) the liquid phase or solvent is non-aqueous, (b) no salt by-products are present, i.e., the dispersion is free of ionic impurities such as can be introduced by reduction methods, (c) dispersing agents can be eliminated, and (d) a wide range of metals and metal oxides may be incorporated.

What the background art has not taught but what this invention teaches is the non-aqueous, direct formation of metal colloids and oxidation products of metal colloids in monomers, which can then undergo polymerization, the compositions being free of inorganic ionic impurities. The present invention further teaches metal colloids dispersed in solid and liquid polymers which, in addition, are free of aliphatic hydrocarbon polymers and their halogen derivatives.

Metal atom processes for these colloidal dispersions are taught. When the metal is in contact with air (oxygen) it is possible to obtain metal oxide as well as metal colloidal particles dispersed in the polymers in the present invention.

In a still further aspect, we have discovered that certain metal colloids in polyglycols serve as a catalyst for the formation of polyurethanes.

In this application:

"free of aliphatic hydrocarbon polymers" means free of homopolymers of aliphatic acyclic monomers of the paraffinic and olefinic types;

"solid" means in the solid state at 20 to 25° C;

"solvated" means stabilized by an organic liquid with respect to further aggregation;

"dilute concentration of colloidal metal in the liquid phase" means 0.001 percent to 10 percent (weight/volume); preferable concentration of colloidal metal in the liquid phase is 0.01 to 1 percent (weight/volume);

"prepolymer" means any low molecular weight polymer or polymers which serve as a precursor to higher molecular weight polymers of the same or different composition;

"direct formation of metal colloids" means formed in one step;

"polymer" means a compound having at least two repeating units;

"polyisocyanate" means a compound having at least two isocyanate groups;

"polyol" means a compound having at least two hydroxyl groups;

"colloidal" or "colloid" means a particle having a size in the range of 1 to 1000 nanometers (nm) that is stable in a liquid medium (diluent) for at least two hours, the particle having in the range of 50 to 100,000 atoms;

"matrix" means the surrounding medium or substance within which the metal colloid is formed;

"metal atom technique" means the Klabunde method, the rotary metal atom reactor method, or the Kimura gas evaporation reactor method disclosed below; and "stable" means will not precipate or flocculate within two hours at 25° C.

DETAILED DESCRIPTION OF THE INVENTION

The present invention provides a polymeric composition of matter comprising a solid polymer or liquid polymer, which is aqueous free and free of aliphatic hydrocarbon polymers and their halogenated derivatives, having dispersed therein at least one of colloidal metal and colloidal metal oxide particles.

In the present invention, a wide variety of metals can be used to prepare the stable colloidal dispersions, including transition metals, heavy metals, and noble metals. Stable colloidal metal dispersions of this invention can be prepared from metals selected from the metals of atomic numbers 11–106. More important metals in order of their atomic numbers are: scandium, titanium, vanadium, chromium, manganese, iron, cobalt, nickel, copper, zinc, gallium, germanium, yttrium, zirconium, niobium, molybdenum, technetium, ruthenium, rhodium, palladium, silver, cadmium, indium, tin, samarium, hafnium, tantalum, tungsten, rhenium, osmium, iridium, platinum, gold, thallium, and lead.

Metals that are of particular importance for purposes of the present invention are: copper, palladium, platinum, gold, silver, cobalt, nickel, iron, manganese, indium, tin, rhodium, iridium, ruthenium, osmium, gadolinium, dysprosium, europium, chromium, tungsten, and samarium.

Metals that are believed to be of special importance for purposes of catalysis are: cobalt, copper, gold, iridium, manganese, palladium, platinum, rhodium, samarium, silver, and tin.

The size of the metal and metal oxide particles is submicrometer in their largest dimension. Preferably the metal particles are in the size range of 2 to 200 nm. The number of atoms per particle is in the range of 50 to 100,000, preferably in the range of 100 to 50,000.

Examples of monomers into which metal colloids can be introduced include vinyl monomers such as styrene, vinyl pyridines, N-vinyl pyrrolidone, vinyl acetate, acrylonitrile, methyl vinyl ketone, methyl methacrylate, methyl acrylate, 2-hydroxyethyl methacrylate, 2-hydroxyethyl acrylate; polyols such as ethylene glycol, 1,6-hexane diol, and 1,4-cyclohexanedicarbinol; polyamines such as 1,6-hexadiamine and 4,4'-methylenebis (N-methylaniline); polycarboxylic acids such as adipic acid and phthalic acids; epoxides such as ethylene oxide, propylene oxide, and cyclohexene oxide; and lactams such as epsilon-caprolactam.

Examples of polymers, some of which are solids and some of which are liquids, into which metal colloids can be introduced (diluted with liquid when necessary) include poly(alkylene glycols) such as poly(ethylene glycol) (PEG), and poly(propylene glycol) (PPG); vinyl polymers such as poly(styrene), poly(vinyl acetate), poly(vinylpyrrolidone), poly(vinylpyridine), and poly(methyl methacrylate); organic liquid-soluble polysaccharides or functionalized polysaccharides such as cellulose acetate; and crosslinked swellable polysaccharides and functionalized polysaccharides such as Sephadex ™ LH-20-100 (Pharmacia, Sweden) and the like. Additionally, the following polymers are useful in the present invention:

polyamides include
  polyhexamethyleneadipamide)[6,6-Nylon]
  poly(ethylene oxide)-Grafted
  poly(hexamethyeneadipamide)
  poly(11-undecanoamide)
  poly(N,N'-hexamethylene-2,5-diketopiperazine)
  poly(decamethyleneoxamide)
  poly(nonamethylenepyromellitimide)
  poly(ethyleneterephthalamide)
  poly(N,N'-diethylethyleneterephthalamide)
  poly(hexamethylene m-benzenesulfonamide)
  poly(beta-alanine) [3-Nylon];
polyureas include
  polydecamethyleneurea
  poly(4-oxaheptamethyleneurea)
  poly[methylene bis(4-phenylurea)]
  polythiosemicarbazide
polyurethanes include
  poly(ethylene N,N,-piperazinedicarboxylate)
  polyurethane of e-hydroxypentanecarbmic acid
  poly(tetramethylene hexamethylene dicarbamate)
  poly[ethylene methylene bis(4-phenylcarbamate)]
polyesters include
  poly(ethylene terephthalate)
  poly(1,4-cyclohexanedicarbinyl terephthalate)
  poly(tetramethylene sebacate)
  poly(glycolic ester)
  poly[2,2-propane bis(4-phenylisophthalateco-terephthalate) (50/50)]
  poly(1,4-phenylene adipate)
  poly(1,4-phenylene phenylphosphonate)
  poly(3,5-dimethyl-1,4-phenylene sulfonate)
  poly(m-phenyl carboxylate)
  copolycarbonate-urethane
  poly(glycolide)
block condensation elastomers include
  poly(ethylene-co-propylene adipate)
  polycaprolactone glycol high temp polymers include
  poly[2,2'(m-phenylene)-5,5'(6,6'-benzimidazole)]
  poly(N-phenyl triazole)
  poly[2,2'(4,4'-oxydiphenylene)-6,6'- oxydiquinoxaline]
polyanhydrides include
  poly(sebacic anhydride)
  poly(1,3-bis(p-carboxyphenoxy)propane anhydride)
polymers derived from vinyl substituted monomers include
  polystyrene
  polymethylmethacrylate
  poly(vinyl chloride-co-vinyl acetate)
  poly(acrylonitrile)
  poly(acrylamideoxime)
  poly(vinyl alcohol)
  poly(vinyl pyridine)
  poly(phenyl vinylene carbonate)

poly(N-vinyl carbazole)
poly(vinylidene cyanide)
polyethers include
  poly(ethylene oxide)
  poly(phenylglycidyl ether)
  poly(epichlorohydrin)
  poly(tetramethylene oxide)
  poly(formaldehyde)
polysiloxanes include
  poly(dimethylsiloxane)
  polydimethylsilmethylene
  polyphenylsilsesquioxane
polycarbodiimides include
  poly(3,3'-dimethoxy-4,4'-biphenylene carbodiimide)
  polyguanidine
cyclic polyhydrocarbons include
  poly(p-xylylene)
  poly($\alpha$, $\alpha$, $\alpha$,-trichloro-p-xylylene) polysaccharides include
  cellulose acetate
Sephadex TM -LH-20-100 Temperature ranges for the metal atom technique (Klabunde method) useful in the preparation of the colloidal dispersion of the invention are in the temperature range of $-200$ to $0°$ C., preferably $-196$ to $-78°$ C. For the rotary metal atom reactor method or the gas evaporation reactor method, useful temperature ranges are those temperatures wherein the matrix, liquid phase, solvents, diluents, and the like are liquid at the temperature range used to form the metal colloids and articles of this invention. A practical useful temperature range is from about $-100°$ to about $100°$ C. Especially convenient temperature ranges are from about $-78°$ to about $50°$ C.

For purposes of the present invention, the liquid phase can be used alone or diluted with a suitable non-aqueous diluent. A diluent can be any solvent or combination of solvents which do not react or interfere with the initial and/or final products or process. Polar and non-polar organic solvents may be used.

In general, polar organic liquids are preferred in Method II since they have greater complexing power or affinities for metal particles than non-polar organic liquids.

Non-polar hydrocarbon liquids which can be useful in Method I or III, such as pentane, are in general less favored in these methods and are often too weakly complexing for use in forming stable colloidal dispersions.

Weakly polar organic liquids containing ether groups which can be useful in Methods I, II, or III, such as diethyl ether, are less effective for solvating metal particles than more polar organic liquids.

Preferred classes of polar organic liquids include $C_1$ to $C_6$ ketones and alcohols such as acetone, cyclohexanone, methylethyl ketone, ethanol and propanol. Higher molecular weight alcohols and ketones can be employed, as well as organic liquids which have other polar groups. Such liquids include dimethylformamide, butyronitrile, 2-undecanone, dimethylsulfoxide, tetrahydrofuran, triethylamine, and the like. Acetone and ethanol are representative polar organic liquids. Other liquids of comparable polarity can be expected to have similar complexing properties for metal particles.

For preparing the colloidal dispersions of the present invention, known apparatus may be employed for forming the metal vapors and contacting them with the organic liquid phase under conditions of high vacuum and low temperature. Specifically, the apparatus described by Klabunde et al. (1979, *Inorg Synth.* 19, 59–86) can be constructed and used.

The Klabunde apparatus includes a vacuum flask connected to a vacuum pump so that a high vacuum can be maintained. The center of the flask is equipped with a crucible for vaporizing metal having an electric resistance heating element. A shower-head type inlet is provided for introducing the liquid phase and directing it toward the side walls. Externally the flask is provided with a removable jacket or Dewar flask for applying liquid nitrogen cooling to the flask. In operation, the liquid phase is introduced as a vapor and co-condenses on the inner walls of the flask together with the vaporized metal atoms This condensation and cooling generates a frozen matrix of metal atoms and organic liquid which builds up on the walls. Following completion of vaporization and condensation, cooling of the flask is discontinued and the matrix is permitted to gradually warm to room temperature.

In another manner, a rotary metal atom reactor can be used, for example, a Torrovap® rotary reactor (Torrovap Industries, Markham, Ontario, Canada). This apparatus includes a reaction vessel which is mounted for rotation, and includes connections for generating a high vacuum therein and for introduction of a liquid or gas. Mounted on a stationary support within the flask is a resistance-heater for vaporizing metal. Externally the flask is provided with removable cooling means, e.g., for applying liquid nitrogen cooling, dry ice cooling and the like.

In one mode of operation of a rotary metal atom reactor, an organic liquid phase is placed within the vessel forming a pool in the lower portion of the vessel. As the vessel rotates the liquid phase flows around the vessel's inside surfaces where the liquid phase is exposed to the metal vapor. The liquid phase recollects in the liquid pool in the lower portion of the rotating vessel. In another mode of operation, the liquid phase, if volatile, can be continuously fed into the flask during vaporization of the metal, and cocondensed in solid form (frozen) on the inner walls of the externally cooled vessel.

Another method of generating the colloidal metal dispersions in nonpolymerizable organic solvents is described by Kimura and Bandow [Bull. Chem. Soc. Jpn. 1983, 56, 3578] in which a gas evaporation method employing a gas evaporation reactor (GER) is used. This technique is used to generate atomic metal vapor from a metal contained in a resistively heated furnace. Metal vapor is carried by means of an inert gas from a furnace chamber into a reaction chamber containing the liquid phase. A major difference in this type of reactor versus the metal atom reactors previously described is that this method operates at much higher pressures due to the presence of the carrier (inert) gas, typically nitrogen, argon, or helium. This reduces the mean free path of the metal atoms so that numerous gas phase collisions occur and colloidal metal particles are formed before the vapor contacts any liquid. Dispersions prepared via this method are similar to those prepared in metal atom reactors of the Klabunde and rotary metal atom reactor types. One advantage of the GER is that since higher pressures are utilized, more volatile liquids may be used and the need for efficient cooling is less stringent. Thus, in a GER, volatile monomers may be used without solvent in the reaction chamber at temperatures where they are still liquid, while in the metal atom reactor, the same monomer would require cocondensing with the metal at 77° K. in order to generate the colloidal dispersion. Further, the GER reduces the chance of undesired polymerization of monomers such as acrylates that may otherwise be caused by heat radiating from the metal source or exposure to higher vacuum.

In preparing the colloidal metal dispersions of this invention, certain operating conditions should be observed, except when the GER method is used. The metal vapor should be generated within a chamber under high vacuum. The pressure should be below $10^{-2}$ Torr, and preferably considerably lower. Pressures below $10^{-4}$ Torr are more preferred, such as in the range of $10^{-5}$ to $10^{-6}$ Torr. Under such high vacuum conditions, the metal which is vaporized in discrete atom form can be maintained in that form until it is contacted with and captured by the organic liquid phase. The organic liquid should be at a temperature at which it is essentially non-reactive with the metal atoms; that is, although the liquid phase solvates the metal atoms, chemical bonds in the liquid phase molecules are not broken.

An excess of liquid phase, undiluted or diluted with an organic solvent, relative to metal is essential. The dispersions should contain highly dilute concentrations of the colloidal metal particles requiring the use of high ratios of liquid phase to metal. On a weight ratio basis, at least from 30 to 50 parts, or more, of liquid phase should be employed per part of metal. The ratio of liquid phase to metal can be selected to prepare dispersions of predetermined metal molarities. Concentrations of 0.0001 to 0.6 molar are usable. A presently preferred concentration range is from about 0.001 to 0.06 molar. The optimum ratio of liquid phase to metal will depend on the particular liquid phase and metal. For certain liquid phases and metals the ratio may be adjusted to give metal dispersions of high molarity. If the dispersion as prepared lacks sufficient stability because of too high a concentration of the dispersed metal, the stability can be improved by reducing the molarity, accordingly increasing the ratio of liquid phase to metal in forming the dispersion.

When the procedure involves cocondensation of the metal and organic liquid or vapor or both with immediate freezing of the organic phase, chemical reaction with the organic phase is effectively prevented. However, freezing of the liquid is not essential. If the organic phase is maintained in liquid form at temperatures within 5–20° C. of its freezing point, or preferably within 5 to 10° C. of its freezing point, the metal atom/liquid phase interaction is also inhibited. Where two or more different metals are to be vaporized, the evacuated chamber may be equipped with a plurality of vaporizing crucibles.

After capturing the metal atoms in an essentially discrete atomic form, the liquid phase, which is either frozen or near its freezing point, is permitted to warm gradually to the ambient room temperature (20–25° C.). Very gradual warming has been found to favor solvation of the metal while minimizing aggregation. The maximum permissible rate of warming depends on the particular apparatus, the metal, the organic liquid, the amount of material, and the conditions of capture. With the Klabunde-type apparatus, it has been found that warming from a liquid nitrogen frozen state at $-196°$ C. to a temperature of 25° C. can be accomplished in 1.5 to 2.5 hours to obtain a stable dispersion. In contrast, going from a liquid nitrogen frozen state to room temperature in 30 minutes or less will often result in precipitation of the metal.

A suitable warming procedure for the metal dispersion with the Klabunde apparatus is the following: A connection to the vacuum pump is closed leaving an attached flask at high vacuum. Liquid nitrogen is removed from the Dewar, which remains surrounding the outside of the flask, permitting slow heat transfer, i.e., warming of the matrix from the room. The frozen matrix on the inner walls of the flask gradually separates from the walls as heat is transferred from the room, and slides down into the bottom portion of the flask which is optionally equipped with a stirrer. The stirrer is rotated slowly to convert the slush of matrix material into a liquid as the melting proceeds. In this way a stable dispersion is usually obtained in about two hours. It has been found inadvisable to fill the flask with a gas such as nitrogen to promote warming by heat transfer within the flask.

After reaching room temperature, the dispersions can be removed, and under ambient conditions, will remain stable for at least 1 to 2 hours (e.g., at 25° C.). Depending on the metal and liquid phase employed, stabilities at 25° C. of at least 12 to 24 hours can be obtained. Certain dispersions are indefinitely stable at room temperatures. In general, the colloidal particles may range in size from 1 to 2000 nanometers (nm). Preferable particle sizes are in the range from 2 to 200 nm. Particle size is most accurately determined by transmission electron microscopy (TEM) measurements, a technique well known in the art.

In the static (Klabunde style) and rotary (Torrovap) metal atom reactor methods, discrete metal atoms are the metal species initially contacting the organic phase either in a cocondensation or solution phase mode. In the latter, aggregation is assumed to begin immediately upon contact of the metal with the liquid phase until a stable particle size is obtained, while in the cocondensation mode, aggregation of the metal occurs upon melting (warming) of the resultant mixture.

The GER method differs from the above two methods as a result of the higher pressures used and the remoteness of the organic phase from the metal. In this case, metal aggregation occurs primarily in the gas phase prior to contact with the organic liquid. All three methods give dispersions having comparable metal particle sizes. A further discussion of these techniques is described by Romanowski, W. *Highly Dispersed Metals;* Wiley: New York, 1987; pp. 41–51.

The metal selected for coating onto a substrate may provide magnetic properties. Ferromagnetic metals usable for this purpose include iron, cobalt, and nickel.

Dispersions of colloidal metals in a matrix, e.g., in poly(alkylene glycol), more commonly referred to as polyglycols, preferably using polyethylene glycol (PEG), have been prepared. A wide variety of metals have been incorporated into the polyglycols, as may be seen in Table I, including those metals which required electron beam (e-beam) evaporation techniques (e.g., vanadium, molybdenum). The process can be utilized with a variety of polyglycols as well. Polypropylene glycols (PPG) behave similarly to PEGs as the nature of the colloid did not change on variation of the polyglycol (see Cu entry in Table I). Especially useful in the practice of this invention is polyethylene glycol 300 (a polyethylene glycol of number average molecular weight, $MW_n \times 300$).

Colloidal dispersions of metals and metal oxidation product such as NiO have been prepared in liquid, low molecular weight polyethylene glycols and polypropylene glycols. Metals are introduced by condensing metal vapors into the cooled liquid polyglycols in a rotating metal atom reactor using metal atom techniques as described in the art.

In most cases, it appears that the initially formed colloid is stabilized by the hydroxyl and ether functionalities of the polyglycol. On exposure of the liquid phase containing the metal colloid to air, color changes, indicative of oxidation, are often observed. Dispersions usually remain stable throughout the color changes. Similarly, several metals (iron, cobalt, aluminum, samarium) yield gels on air exposure. The observed phenomenon of increased viscosity (gelation) of the liquid phase may be attributed to crosslinking of the polyglycols via metal alkoxide formation or oxidation of the metal since several metal oxides are known to form gelatinous precipitates.

In the case of manganese, no color formation is observed during its condensation into the polyglycols, yet, on exposure to air of the resultant clear, colorless mixture, a dark brown color rapidly develops, indicative of molecular complex formation followed by oxidation to colloidal manganese oxides.

The polyglycol/colloid liquid phase may be highly colored, appears to be very stable, retains its homogeneity on storage for several months, and may be diluted with solvents such as methanol and acetone; however, the diluted colloids are not as stable and precipitation is observed over the course of several hours. The colloids were analyzed by transmission electron microscopy (TEM) and the observed particle sizes are listed in Table I. A broad range of particle sizes was found depending on the metal used. Metal contents were analyzed by inductively coupled plasma spectroscopy (ICP).

TABLE I

Summary of colloid formation by the reaction of metal atoms with polyglycols.

| metal[a] | aglycol[b] | size (nm)[c] | observations |
|---|---|---|---|
| V (1180) | PEG-400 | 40–50 | brown dispersion, gradually becomes greenish |
| Mo (671) | PEG-400 | 100 | brown dispersion |
| Mn | PEG-300 | 30–60 | colorless dispersion, dark brown on air exposure |
| (1102) | PEG-400 | | |
| | PEG-425 | | |
| Fe | PEG-200 | — | brown-black dispersion, reddish gel on air exposure |
| Co (3038) | PEG-400 | <7 | brown dispersion, became purple in storage, gels slowly |
| Ni (567) | PEG-400 | <7 | green-brown dispersion, became pale green on storage |
| Cu | PEG-200 | <10 | red-brown dispersion, becomes green on air exposure |
| (1215) | PEG-300 | | |
| (1641) | PEG-400 | | |
| (997) | PPG-425 | | |
| Sn | PEG-200 | <15 | brown dispersion, becomes cloudy and deposits fine black powder on prolonged air exposure |
| (429) | PEG-400 | | |

In another aspect of this invention, the polyglycol containing metal colloids, in the presence of a catalyst, such as an amine, reacted with toluene 2,4-diisocyanate (TDI) to form metal colloid-containing polyurethanes. They are, in general, similar in appearance to the original colloidal metal-containing polyglycol. The color of the resultant polyurethanes depended upon the metal or metals incorporated therein. Metals incorporated into polyurethanes include cobalt, copper, manganese, molybdenum, nickel, samarium, tin, and vanadium. In the case where oxidation products of the metal colloid were formed, the resultant polyurethanes contained these oxidation products. Often times the oxidation process was accompanied by a color change.

In yet another aspect of this invention, we have discovered that certain metals (e.g., cobalt, samarium, and tin) as a colloid in a polyglycol such as PEG-300 or PEG-400 catalyzed a reaction with an added polyisocyanate to provide polyurethanes containing the colloidal metal. Samarium was a particularly effective catalyst.

The amount of metal that may be incorporated into the resultant polyurethanes is from about 0.00001 to about 0.1 g per cubic centimeter (cc) of polyurethane and usually from about 0.0001 to about 0.01 g per cc of polyurethane.

Besides providing polyurethanes containing colloidal metal, and/or metal oxidation products, additional advantages of the present method and advances in the art are (a) colloidal metals can be incorporated into solid or liquid polymers at room temperature or below, (b) particle size of the dispersed colloid is more readily controlled than by other methods [see for example Szalinska, H.; Pietrzak, M. Polym.-Plast. Technol. Eng., 1982, 19, 107 (1982)], and (c), a considerably larger variety of metal and/or metal oxide colloids and mixtures thereof may be incorporated into a polymer.

In place of commercial toluene 2,4-diisocyanate, other polyisocyanates can be used including those polyisocyanates used in the preparation of polyurethanes well known in the art. The homogeneous colloidal metal-containing polyglycols described (see TABLE I) may be converted to colloidal metal-containing polyurethanes by methods also well known in the art.

The chemistry involved in the formation of polyurethanes is well understood (see Stevens, M. P., "Polymer Chemistry, and Introduction"; Addison-Wesley, Reading, MA, 1975; pp 295–301) and is referred to for the sake of brevity. Polyurethane formation usually requires catalysts such as tertiary amines or certain Lewis acids such as tin salts. These same catalysts are useful in this invention for the reaction of colloidal metal-containing polyols with polyisocyanates. The inherent, spontaneous catalytic capability of the colloidal metal/polyol (Co/PEG-400, Sn/PEG-400, and Sm/PEG-300) was described above.

The resultant colloidal metal-containing polyurethanes obtained were very similar in color to the starting colloidal metal-containing polyglycols. This indicates that the colloid was incorporated into the polymer relatively unchanged, and was confirmed by transmission electron microscopy (TEM) on a Sn/polyurethane composite. A microtomed sample revealed particles in the 10–30 nm size range; the metal colloid was evenly dispersed throughout the polymer.

Articles such as films comprising these colloidal metal-containing polyurethanes have been prepared. Films of these polyurethanes, prior to their complete curing, were cast onto organic or inorganic substrates. These films appeared to adhere well to glass. A range of elastic properties, from rubbery to very brittle, was observed in these films. This is probably related to the relative amounts of polyglycol and TDI used.

Other examples of utility of the colloidal metal-containing polyurethanes of this invention include colored polyurethanes and a method therefor, catalysts, biocidal and fungicidal coatings and polymers, magnets or materials with magnetic and magnetizable properties, and a means for modifying rheological properties of polyurethanes.

Substrate-coated composites of this invention may be useful for decorative purposes because of the color imparted by the colloidal metal and/or colloidal metal oxide present, and for membrane-supported catalysts.

Coated composites comprising a colloidal metal-containing polymer on a substrate such as a polymeric film can be provided by the present invention. It is possible that some residual solvent, where used, will remain associated with the polymer coating. Residual solvent can be removed by room temperature evaporation or by subjecting the coating to heat, for example temperatures of 100° C. or higher as long as the integrity of the resultant composite is maintained. Final coatings, films, and composites may still contain a small amount of organic solvents or fragments derived therefrom. In addition, the films may be self-supporting and can be useful where nonconductive metal-containing polymers are desired.

Objects and advantages of this invention are further illustrated by the following examples, but the particular materials and amounts thereof recited in these examples, as well as other conditions and details, should not be construed to unduly limit this invention.

EXAMPLES

When working with finely divided metals, precaution is advised because of their possible pyrophoric nature.

Examples are presented describing formation of articles such as films and polymers containing metal colloids, prepared by the metal atom technique, in which the initial step consists of formation of the metal colloid in a nonpolymerizable organic liquid, in a monomer, in a prepolymer, in a polymer, or in mixtures of the above. When colloidal metal-containing monomers are prepared (either alone, undiluted or diluted with a diluent, or with polymerizable polymers, prepolymers, or co-monomer) polymers can be subsequently formed using addition or step-growth polymerization techniques.

EXAMPLE 1

This example describes the formation of colloidal metal in a nonpolymerizable organic liquid and subsequent incorporation in a polymeric film.

Gold metal (0.53 g, 99.95% pure) was codeposited with 100 mL acetone in a rotary metal atom evaporator (Torrovap Industries, Markham, Ontario, Canada, Model TM800-1) at −196° C. The frozen matrix was allowed to warm to room temperature by removing an external cold bath of liquid nitrogen. The resulting purple dispersion was filtered and showed an absorption maximum at 530 nm. When low molecular weight poly(styrene) (MW=10,000, Commercial Chemicals Division, 3M, St. Paul, MN) was dissolved in the above dispersion, there was no precipitate and no noticeable color change indicative of aggregation. Films which contained colloidal gold, as shown by transmission electron microscopy (TEM), were cast onto inorganic substrates such as glass and organic substrates such as plastic using standard coating techniques. Particle size of colloidal gold was similar to that found in the parent colloidal gold/acetone dispersion.

EXAMPLE 2

This example describes the formation of colloidal metal in a monomer and subsequent free radical polymerization to yield a solid, colloidal metal-containing polymer.

All reactions were carried out under a nitrogen atmosphere using reagent grade solvents as received unless otherwise noted. Gold (0.17 g) and freshly distilled methyl methacrylate (MMA, 145 mL) were cocondensed at −196° C using a metal atom rotary reactor. The product was a dark matrix, which upon warming slowly to room temperature, gave a reddish-purple liquid and a small amount of a black solid, which was removed by filtration. The filtrate was added to 200 mL of ethyl acetate which had previously been degassed by the freeze-thaw technique. Approximately 100 mg of azoisobutyronitrile initiator were added and the mixture heated at 70° C. in a vessel equipped with a water cooled condenser and a mechanical stirrer. After 24 hours, the liquid had become more viscous. More initiator was added and stirring was continued at 70° C. Seventy-two hours later, the mixture had completely solidified.

At this stage, there was no further need to eliminate oxygen; subsequent steps were performed in air. Copius amounts of ethyl acetate were added to the solid mass to redissolve the polymer. The resulting liquid, concentrated to a final volume of 500 mL, was then allowed to drip into an excess of rapidly stirred methanol to precipitate the polymer. When addition was complete, the mixture was filtered to give a colorless filtrate and a pale purple solid. This reprecipitation process was repeated two more times and the final product was then vacuum dried at 60° C. overnight.

EXAMPLE 3

This example describes the casting of a gold-containing polymeric film onto a substrate using the gold-containing polymethyl methacrylate of Example 2.

The polymer described in Example 2 was dissolved in methyl ethyl ketone to give a purple dispersion. It was coated onto a glass substrate using conventional coating technique, to provide a pale purple film containing colloidal gold as shown by TEM.

EXAMPLE 4

This example describes the formation of nonaggregated, spherical colloidal gold into a monomer with in situ formation of a solid polymer.

Monomer 2-hydroxyethyl methacrylate (HEMA, Aldrich Chemical Co., Milwaukee, WI) was cocondensed with 0.21 g gold at a temperature of −110° C. using an external pentane slush bath for cooling. Upon warming to room temperature, the monomer was found to no longer be fluid. The resultant reddish polymer was removed from the flask by allowing it to first swell in the presence of water for several days. The polymer was isolated as a rubbery film which, upon drying, became extremely brittle. TEM results indicated the presence of spherical gold particles having average diameters of less than 13 nm with no apparent aggregation of the discrete particles occurring.

EXAMPLE 5

This example describes the formation of colloidal metal in prepolymers and subsequent catalyzed step growth polymerization.

Vanadium metal (0.57 g) was evaporated in a rotary evaporator via electron beam techniques [see Blackborow, J. R.; Young, D. *Metal Vapour Synthesis in Organometallic Chemistry*, Springer Verlag: Berlin, Germany, 1979; Klabunde, K. J. *Chemistry of Free Atoms and Particles*, Academic Press, N.Y., 1980] into 150 mL of polyethylene glycol ($MW_n=400$) at approximately 0° C. over the course of 80 minutes. The brownish mixture was then exposed to air and filtered through a medium porosity glass frit to give a uniformly colored green-brown dispersion, which was stable over the course of several months; a gradual color change to green was noted. Presence of colloidal particles in the size range of 20–30 nm was shown by TEM. When an equal volume of this vanadium dispersion and toluene 2,4-diisocyanate (TDI, Mobay Chemical Co., Pittsburgh, PA) were mixed, a uniformly colored green mixture formed which appeared similar in color to the starting dispersion. No reaction appeared to occur until a drop of triethylamine was added, whereupon an exothermic reaction was noted to provide a vanadium-polyurethane composite as a mixture of a clear greenish mass and an opaque green rigid foam. Vanadium in the foam was established by ICP spectroscopy.

EXAMPLE 6

This example describes the formation of colloidal metal in a common organic solvent, dissolving a polymer in the resultant mixture, and casting therefrom a colloidal metal-containing film.

To a 5 mL sample of dispersed colloidal gold in acetone prepared as in Example 1 was added approximately 0.25 g cellulose acetate (Kodak 4650, 39.9% acetyl content, Eastman Kodak Co., Rochester, N.Y.) and the mixture was vigorously stirred. The solid polymer dissolved to give a viscous purple mixture of cellulose acetate and colloidal gold. Free-standing polymer films containing dispersed colloidal gold were formed by casting the fluid mixture on a glass substrate and allowing the liquid to evaporate. The presence of colloidal gold was confirmed by TEM.

EXAMPLE 7

This example illustrates the affinity of a polymer for colloidal metal particles.

A portion of the fluid mixture described in Example 6 containing acetone, dissolved cellulose acetate, and colloidal gold was poured into water to cause precipitation of the polymer, which was collected by filtration. The colloidal gold was shown by TEM to be in the polymer. Further evidence was provided by the pale purple color of the polymer and the lack of color in the filtrate.

EXAMPLE 8

This example describes the use of a gas evaporation reactor (GER) to form colloidal metal dispersions in a polymer.

A gas evaporation reactor (GER) was built based on designs essentially according to Kimura and Bandow (supra) Using nitrogen as a carrier gas and acetone as the organic liquid, the GER was used to make a colloidal gold dispersion in acetone. The resulting dispersion behaved in all ways like the dispersions prepared using the metal atom reactor. When soluble polystyrene was added to this dispersion and thin films cast, colloidal gold was incorporated into the films.

EXAMPLE 9

This example describes the formation of a colloidal copper dispersion in polyethylene glycol 300 (PEG-300).

Polyethylene glycol (PEG-300, 150 mL, EM Science, Cherry Hill, N.J.) was placed in the 5 L reaction flask of a Torrovap brand rotary metal atom reactor. The flask was mounted on the reactor, cooled to 0° C., rotated, and the system was evacuated to $10^{-5}$ torr. Copper metal (0.40 g) was evaporated into the rotating PEG-300 liquid from a resistively (21.5 A, 2.12 v) heated alumina coated tungsten wire crucible (GTE Sylvania, Exeter, N.H.) over the course of 45 min. The PEG gradually acquired a red-brown color as the evaporation progressed. Copper evaporation was stopped and the vacuum was broken with nitrogen after the crucible had cooled. The flask was removed and the contents were filtered through a medium porosity glass frit to give a red-brown filtrate. Aliquots of this filtrate which were stored in screw-cap sample vials retained the red-brown color for several weeks. Aliquots which were allowed to stand in open containers developed a green coloration over the course of several hours. The dispersions remained stable throughout the color change. Oxidation of copper to copper oxide was believed to be responsible for the color change.

EXAMPLE 10

This example describes the preparation of colloidal copper dispersion in PPG-425 and subsequent reaction with an added isocyanate to provide a copper-containing polyurethane.

Polypropylene glycol (PPG-425, 100 ml, Aldrich Chemical Co., Milwaukee, WI) was placed in a 5 L reaction flask attached to a Torrovap brand rotary metal atom reactor. The flask was cooled to 0° C. and evacuated to $10^{-6}$ torr Copper metal (0.16 g) was evaporated from an alumina coated tungsten wire crucible (GTE Sylvania) into the PPG-425 over the course of 45 min. to give a red-brown PPG/Cu colloid. The vacuum was broken with nitrogen after the crucible had cooled and the colloid was filtered in air through a medium porosity glass frit to give a homogeneous red-brown filtrate. The filtrate changed color to a homogeneous brown-green solution prior to conversion to polyurethane. An aliquot of the filtrate (1 part by volume) was mixed with a sample (2 parts by volume) of TDI to give a stable brown-green disperson; no reaction appeared to occur until one drop of triethylamine was added and the solution was stirred. A rapid exothermic reaction ensued and the solution became very viscous until stirring was no longer possible. The sample continued to react over the course of several minutes to yield a solid block of clear, brown-green polyurethane and some brownish rigid polyurethane foam.

EXAMPLE 11

This example describes the preparation of a colloidal samarium dispersion in PEG-300 and its subsequent use in the catalysis of the step growth polymerization of polyglycol with diisocyanate.

Polyethylene glycol (PEG-300, 100 ml, EM Science, Cherry Hill, N.J.) was placed in the 5 L reaction flask of a Torrovap rotary metal atom reactor. The flask was mounted on the reactor, cooled to 0° C., rotated, and the system was evacuated to $10^{-5}$ torr. Samarium metal (1.59 g) was evaporated from a resistively (15 A, 1.2 v) heated alumina coated tungsten wire crucible (GTE Sylvania, Exeter, NH) over the course of 20 min. The PEG gradually acquired an emerald green color as the evaporation progressed. Samarium evaporation was stopped and the vacuum was broken with nitrogen after the crucible had cooled. The flask was removed and the contents were filtered through a medium porosity glass frit to give a uniform emerald green filtrate The filtrate was stored in screw-cap sample vials. After 24 hours, the color of the filtrate had changed from green to pale yellow. A sample of this yellow material gelled slowly on prolonged exposure to air.

An aliquot of the green filtrate was mixed with an equal volume of TDI. A vigorous and exothermic reaction rapidly ensued to yield a solid block of clear, pale yellow polyurethane. Aliquots of the pale yellow Sm/PEG-300 dispersion were equally effective in forming polyurethane when mixed with TDI. As a control, a 4 mL sample containing equal volumes of PEG-300 and TDI was prepared. No reaction was observed until two drops of the pale yellow Sm/PEG-300 dispersion was added. Upon mixing, a rapid and exothermic reaction ensued to yield a solid block of essentially colorless polyurethane.

EXAMPLE 12

This example describes the incorporation of colloidal metal particles into the swollen network of a cross-linked, functionalized polysaccharide.

A sample of Sephadex TM LH-20-100 beads (an alkylated, cross-linked dextran polysaccharide with uniform swelling properties in organic solvents; product of Pharmacia Fine Chemicals Inc.) was suspended in toluene and stirred for a sufficient time to allow swelling of the polysaccharide by the organic liquid medium. To the resulting mixture was added 3 ml of a 0.03% (Wt/Vol) colloidal gold dispersion (prepared via cocondensation using the Torrovap TM rotary reactor) in acetone with vigorous stirring. After allowing the swollen polysaccharide beads to settle, the supernatent liquid appeared completely colorless whereas the polymer beads had acquired the purple coloration characteristic of colloidal gold, thus indicating that the swollen polymer had effectively sequestered all of the colloidal gold from suspension. The gold impregnated Sephadex TM was isolated by filtration and dried in vacuo at $10^{-3}$ torr at room temperature for 3 hours. Elemental analysis of the dry beads revealed a gold loading of 0.039% (Wt/Wt). Transmission electron micrographs of sectioned beads showed a non-uniform distribution of colloidal gold particles (2-8 nm in diameter) located within the pores of the cross-linked polymer network.

A summary of the representative metal-containing polymers and methods for their preparation is given in TABLE II, below.

TABLE II

| Trial Number | Example Number | Metal | Polymer | Method* |
|---|---|---|---|---|
| 1 | 2 | Au | poly(MMA) | B |
| 2 | 4 | Au | poly(HEMA) | C |
| 3 | 6,7 | Au | cellulose acetate | A |
| 4 | 1 | Au | poly(styrene) | A |
| 5 | 5 | V | poly(urethane) | D |
| 6 | 12 | Au | Sephadex TM LH-20-100 | A |

*brief explanation of methods:
A metal colloid formed in a nonpolymerizable organic liquid then soluble or swellable polymer added; resultant mixture cast to give a film, or liquid removed, or polymer precipitated.
B metal colloid formed in monomer, without diluent, then polymerization carried out using well known polymerization techniques.
C metal colloid formed in monomer; polymerization occurs simultaneously
D metal colloid formed in prepolymer; polymerization takes place subsequently Various modifications and alterations of this invention will become apparent to those skilled in the art Without departing from the scope and spirit of this invention, and it should be understood that this invention is not to be unduly limited to the illustrative embodiments set forth herein.

We claim:

1. A method for preparing a colloidal elemental metal-containing composition comprising a polymer having dispersed therein submicron size colloidal elemental metal particles in an amount of 0.001 to 10 percent (wt/vol) comprising the steps of Method I, Method II, or Method III;

Method I:
 (a) providing, by the metal atom technique, a metal colloid in a polymerizable aqueous-free liquid monomer,
 (b) effecting polymerization of said monomer, and
 (c) isolating the resultant colloidal metal-containing polymer;

Method II:
 (a) providing a non-polymerizable, non-aqueous organic liquid, performing in either order steps (b) and (c), provided that when step (c) precedes step (b) sufficient liquid is present to provide a dispersion of metal in a liquid,
 (b) forming a colloidal metal dispersion by the metal atom technique in said liquid,
 (c) dissolving into or swelling a solid polymer in said liquid, and
 (d) isolating the resultant colloidal metal-containing polymer; and Method III:
 (a) providing a colloidal metal dispersion, by the metal atom technique, in an aqueous free liquid polymer,
 (b) effecting further polymerization of the polymer, and
 (c) isolating the resulting colloidal metal-containing polymer;

said metal atom technique comprising forming metal vapors and contacting them with said liquid.

2. The method according to claim 1 wherein the components of step (a) of Methods I and III or step (b) of Method II further comprise a non-aqueous diluent.

3. The method according to claim 1 wherein said colloidal metal particles have sizes in the range of 2 to 200 nm.

4. The method according to claim 1 wherein in Method III said liquid polymer is a polyglycol and said further polymerization takes place in the presence of a polyisocyanate.

5. The method according to claim 4 wherein said further polymerization takes place in the presence of an effective amount of a catalyst.

6. A method for preparing a colloidal elemental metal-containing composition comprising a polymer having dispersed therein submicrometer size colloidal elemental metal particles in an amount of 0.00 to 10 percent (wt/vol) comprising the steps:
(a) providing a colloidal metal dispersion in a polymerizable aqueous-free liquid monomer by forming metal vapors and contacting them with said liquid monomer,
(b) effecting polymerization of said monomer, and
(c) isolating the resultant colloidal metal-containing polymer.

7. A method for preparing a colloidal elemental metal-containing composition comprising a polymer having dispersed therein submicrometer size colloidal elemental metal particles in an amount of 0.001 to 10 percent (wt/vol) comprising the steps:
(a) providing a nonpolymerizable, non-aqueous organic liquid, performing in either order steps (b) and (c), provided that when step (c) precedes step (b) sufficient liquid is present to provide a dispersion of metal in a liquid,
(b) forming a colloidal metal dispersion in said organic liquid by forming metal vapors and contacting them with said liquid, and
c) dissolving into a swelling a solid polymer in said liquid, and
(d) isolating the resultant colloidal metal-containing polymer.

8. A method for preparing a colloidal elemental metal-containing composition comprising a polymer having dispersed therein submicrometer size colloidal elemental metal particles in an amount of 0.00 to 10 percent (wt/vol) comprising the steps:
(a) providing a colloidal metal dispersion in a liquid polymer by forming metal vapors and contacting them with said liquid polymer,
(b) effecting further polymerization of said polymer, and
(c) isolating the resulting colloidal metal-containing polymer.

9. A method for preparing a colloidal metal-containing polyurethane comprising the steps:
(a) providing a colloidal metal dispersion in a polyglycol using the metal atom technique,
(b) reacting the resulting colloidal metal-containing polyglycol with a polyisocyanate to provide a polyurethane, and
(c) isolating the resulting metal-containing polyurethane.

10. The method according to claim 9 further comprising a catalyst added to the reactants of step b.

11. The method according to claim 10 wherein said catalyst is an amine.

12. The method according to claim 11 wherein said amine is triethylamine.

13. The method according to claim 10 wherein said catalyst is the colloidal metal dispersion of cobalt, tin, or samarium.

14. The method according to claim 13 wherein said catalyst is the colloidal metal dispersion of cobalt, tin, or samarium in a matrix.

15. The method according to claim 13 wherein said matrix is a poly(alkyleneglycol).

16. A method for preparing a colloidal metal-containing composition comprising a polymer having dispersed therein submicron size colloidal metal particles in an amount of 0.001 to 10 percent (wt/vol) comprising the steps of Method I, Method II, or Method III;
Method I:
(a) providing, by the metal atom technique, a metal colloid in a polymerizable aqueous-free liquid monomer,
(b) effecting polymerization of said monomer, and
(c) isolating the resultant colloidal metal-containing polymer;
Method II:
(a) providing a non-polymerizable, non-aqueous organic liquid, performing in either order steps (b) and (c), provided that when step (c) precedes step (b) sufficient liquid is present to provide a dispersion of metal in a liquid,
(b) forming a colloidal metal dispersion by the metal atom technique in said liquid,
(c) dissolving into or swelling a solid polymer in said liquid, and
(d) isolating the resultant colloidal metal-containing polymer; and
Method III:
(a) providing a colloidal metal dispersion, by the metal atom technique, in an aqueous free liquid polymer,
(b) effecting further polymerization of the polymer, and
(c) isolating the resulting colloidal metal-containing polymer; said metal atom technique comprising forming metal vapors and contacting them with said liquid, wherein methods I, II and 111 further comprise the step of exposing said colloidal metal dispersion to air to provide a dispersion comprising a metal oxidation product.

* * * * *

UNITED STATES PATENT AND TRADEMARK OFFICE
CERTIFICATE OF CORRECTION

PATENT NO. : 4,871,790

DATED : October 3, 1989

INVENTOR(S) : William M. Lamanna et al.

It is certified that error appears in the above-identified patent and that said Letters Patent is hereby corrected as shown below:

Col. 4, line 30, "e-hydroxypentanecarbmic" should read --$\varepsilon$-hydroxypentanecarbamic--.

Col. 6, line 2, after the word "Inorg" kindly insert -- . --.

Col. 6, line 47, "3578]in" should read -- 3578] in --.

Col. 8, line 68, "$MW_n$X300" should read -- $MW_n = 300$ --.

Col. 9, line 2, "product" should read -- products --.

Col. 9, line 64, kindly add the following to the end of Table I:

-- Pb (18)   PEG-400   15   colorless dispersion
   Sm (8620) PEG-300   NA   dark emerald-green dispersion, becomes pale yellow on storage; gels on air exposure a) metal content, ppm, by ICP
b) PEG = polyethylene glycol, PPG = polypropylene glycol, the number refers to the number average molecular weight
c) estimates from TEM data --.

UNITED STATES PATENT AND TRADEMARK OFFICE
CERTIFICATE OF CORRECTION

PATENT NO. : 4,871,790

DATED : October 3, 1989

INVENTOR(S) : William M. Lamanna et al.

It is certified that error appears in the above-identified patent and that said Letters Patent is hereby corrected as shown below:

Col. 11, line 20, between "example" and "temperatures" kindly insert --, at --.

Col. 13, line 66, after "(supra)" kindly insert -- . --.

Col. 16, line 17, "Without" should read -- without --.

Col. 17, line 7, "0.00" should read -- 0.001 --.

Col. 17, line 38, "0.00" should read -- 0.001 --.

Col. 18, line 50, "111" should read -- III --.

Signed and Sealed this

Fifteenth Day of December, 1992

*Attest:*

DOUGLAS B. COMER

*Attesting Officer*     *Acting Commissioner of Patents and Trademarks*